(12) United States Patent
Nam

(10) Patent No.: US 9,359,045 B2
(45) Date of Patent: Jun. 7, 2016

(54) MARINE VESSEL WINCH EQUIPPED WITH HERMETICALLY SEALED CLUTCH

(71) Applicant: Gi Suk Nam, Busan (KR)

(72) Inventor: Gi Suk Nam, Busan (KR)

( * ) Notice: Subject to any disclaimer, the term of this patent is extended or adjusted under 35 U.S.C. 154(b) by 132 days.

(21) Appl. No.: 14/047,127

(22) Filed: Oct. 7, 2013

(65) Prior Publication Data

US 2014/0217341 A1 Aug. 7, 2014

(30) Foreign Application Priority Data

Feb. 6, 2013 (KR) ........................ 10-2013-0013267

(51) Int. Cl.
| | |
|---|---|
| *B66D 1/14* | (2006.01) |
| *B63B 21/16* | (2006.01) |
| *B66D 1/26* | (2006.01) |
| *F16D 11/16* | (2006.01) |

(52) U.S. Cl.
CPC . *B63B 21/16* (2013.01); *B66D 1/14* (2013.01); *B66D 1/26* (2013.01); *F16D 11/16* (2013.01)

(58) Field of Classification Search
CPC ......... F16D 11/14; F16D 21/04; F16D 23/12; F16D 2023/126; F16D 2300/08; B66D 1/14; B66D 1/26; B66D 1/30; B66D 1/42; B63B 21/16
See application file for complete search history.

(56) References Cited

U.S. PATENT DOCUMENTS

| | | | | |
|---|---|---|---|---|
| 1,517,616 | A | * | 12/1924 | Clayden ...................... 192/17 R |
| 2,017,352 | A | * | 10/1935 | Quick ........................... 254/350 |
| 3,392,926 | A | * | 7/1968 | Adams .......................... 254/276 |
| 3,575,459 | A | * | 4/1971 | Coblenz ..................... 294/82.32 |
| 3,690,327 | A | * | 9/1972 | Heitmann ....................... 131/94 |
| 3,722,645 | A | * | 3/1973 | Sommer .................... 192/70.13 |
| 3,738,614 | A | * | 6/1973 | Peterson ....................... 254/358 |
| 3,865,251 | A | * | 2/1975 | Langford ........................ 212/71 |
| 3,927,580 | A | * | 12/1975 | Fawcett ....................... 74/810.1 |
| 4,018,424 | A | * | 4/1977 | Latimer ........................ 254/323 |
| 4,284,265 | A | * | 8/1981 | Morrow, Sr. .................. 254/317 |

(Continued)

FOREIGN PATENT DOCUMENTS

| | | |
|---|---|---|
| JP | 2011219239 A | 11/2011 |
| KR | 100277291 B1 | 10/2000 |
| KR | 1020120037794 A1 | 4/2012 |

OTHER PUBLICATIONS

European Search Report issued Aug. 25, 2014 for Application No. 13192043.1-1705/2765111.

*Primary Examiner* — Emmanuel M Marcelo
*Assistant Examiner* — Michael Gallion
(74) *Attorney, Agent, or Firm* — Roger D. Emerson; Emerson Thomson Bennett, LLC

(57) ABSTRACT

The present invention relates to a marine vessel winch equipped with hermetically sealed clutches including: a support plate on which a plurality of support frames is disposed; a rotary shaft rotatably coupled to the support frames; a rope drum having a first fixing clutch mounted on one side thereof; a chain drum having a second fixing clutch mounted on one side thereof; a first moving clutch and a second moving clutch coupled slidably movably to the rotary shaft and selectively engaged with the first fixing clutch and the second fixing clutch; and sealing members having one side surfaces coupled in circumferential directions to predetermined positions of the outer peripheral surfaces of the rope drum and the chain drum and having the lower portions of the other side surfaces brought into contact with the outer peripheral surfaces of the first moving clutch and the second moving clutch.

4 Claims, 4 Drawing Sheets

(56) References Cited

U.S. PATENT DOCUMENTS

| | | | | |
|---|---|---|---|---|
| 4,353,527 A * | 10/1982 | Langford | | 254/304 |
| 4,444,375 A * | 4/1984 | Horn | | 254/346 |
| 4,493,333 A * | 1/1985 | Layton | | 134/76 |
| 4,588,167 A * | 5/1986 | Finzel | | 254/346 |
| 4,683,994 A * | 8/1987 | Weisenfelder | | 192/3.61 |
| 5,992,592 A * | 11/1999 | Showalter | | 192/43.1 |
| 6,902,048 B1 * | 6/2005 | Chung | | 192/48.2 |
| 7,270,312 B1 * | 9/2007 | Phipps | | 254/297 |
| 7,556,240 B1 * | 7/2009 | Bauer et al. | | 254/294 |
| 8,973,902 B2 * | 3/2015 | Huang | | 254/355 |
| 2001/0047654 A1 * | 12/2001 | Rush et al. | | 60/413 |
| 2005/0006633 A1 * | 1/2005 | Franks | | 254/378 |
| 2006/0049009 A1 * | 3/2006 | Arnold et al. | | 188/82.6 |
| 2006/0070784 A1 * | 4/2006 | Tahara | | 180/205 |
| 2010/0065799 A1 * | 3/2010 | Zhou et al. | | 254/344 |
| 2011/0037040 A1 * | 2/2011 | Hess | | 254/322 |
| 2011/0073297 A1 * | 3/2011 | Williams | | 166/75.11 |
| 2013/0305954 A1 * | 11/2013 | Ogden | | 104/173.2 |
| 2014/0174879 A1 * | 6/2014 | Huang | | 192/71 |
| 2014/0190781 A1 * | 7/2014 | Lawson et al. | | 192/69.8 |

* cited by examiner

MARINE VESSEL WINCH EQUIPPED WITH HERMETICALLY SEALED CLUTCH

CROSS-REFERENCE TO RELATED APPLICATION

This application is based on and claims priority from Korean Patent Application No. 10-2013-0013267 filed on Feb. 6, 2013 in the Korean Intellectual Property Office, the disclosure of which is incorporated herein in its entirety by reference.

BACKGROUND OF THE INVENTION

1. Field of the Invention

The present invention relates to a marine vessel winch, and more particularly, to a marine vessel winch equipped with hermetically sealed clutches that is adapted to transmit a rotary force of a motor to drums and, through the rotation of the drums, to conduct vessel anchoring in a harbor, to allow all kinds of fishing tools and equipment of the marine vessel to be put into or drawn up from the sea, or to conduct vessel towing.

2. Background of the Related Art

Generally, a vessel is equipped with a winch used to put or draw all kinds of fishing tools and equipment needed in the marine vessel into or from the sea or to conduct the vessel towing and anchoring.

Referring to FIG. 1 showing a conventional marine vessel winch, the marine vessel winch includes a motor 10 providing a driving force, a decelerator 20 connected to the motor 10 to decelerate the rotary force transmitted from the motor 10, a drum 30 operated cooperatively with the decelerator 20 to wind a rope and a chain thereon, a clutch 40 adapted to selectively transmit the driving force to the drum 30, and a shaft 50 connected to the decelerator 20 at one end thereof in such a manner as to be coupled to the drum 30 on the outer peripheral surface thereof.

Further, the clutch 40 is slidably mounted on the shaft 50 in the direction of the shaft 50 and has a pipe-like clutch block 60 having a groove 61 formed on the outer peripheral surface thereof. At this time, the clutch block 60 and the drum 30 have a protrusion 62 and a fastening groove 31 formed engaged with each other on their facing surface.

Accordingly, the rotation of the drum 30 is selectively controlled in accordance with the sliding movement of the clutch block 60 on the shaft 50 to the left side or the right side through the manipulation of an operator.

Since the conventional vessel winch is mounted on the outside of the vessel, however, seawater enters the drum 30 and the clutch block 60 to cause them to be rotten or to make sediments accumulated thereinto, thereby undesirably disturbing the gentle operation of the vessel winch.

SUMMARY OF THE INVENTION

Accordingly, the present invention has been made in view of the above-mentioned problems occurring in the prior art, and it is an object of the present invention to provide a marine vessel winch equipped with hermetically sealed clutches that can be provided with sealed space in which the introduction of seawater or the accumulation of sediments is prevented, thereby allowing the operation of the vessel winch to be gently conducted.

To accomplish the above object, according to the present invention, there is provided a marine vessel winch equipped with hermetically sealed clutches, including: a support plate on which a plurality of support frames is disposed; a rotary shaft rotatably coupled to the support frames; a rope drum rotatably coupled to the rotary shaft at a predetermined position in the longitudinal direction of the rotary shaft and having a first fixing clutch mounted on one side thereof; a chain drum rotatably coupled to the rotary shaft in such a manner as to be spaced apart from the rope drum by a given distance and having a second fixing clutch mounted on one side thereof; a first moving clutch and a second moving clutch coupled slidably movably to the rotary shaft in such a manner as to be spaced apart from one sides of the rope drum and the chain drum and selectively engaged with the first fixing clutch and the second fixing clutch to transmit the rotary force of the rotary shaft to the rope drum and the chain drum; and sealing members having one side surfaces coupled in circumferential directions to predetermined positions of the outer peripheral surfaces of the rope drum and the chain drum and having the lower portions of the other side surfaces brought into contact with the outer peripheral surfaces of the first moving clutch and the second moving clutch.

According to the present invention, desirably, on one side of any one of the support frames is disposed a driving motor, and at the inside of the support frame on which the driving motor is disposed is mounted a decelerator adapted to connect a driving shaft of the driving motor with the end portion of the rotary shaft and thus to transmit the driving force of the driving motor to the rotary shaft.

According to the present invention, desirably, each sealing member includes: a cover having one side surface coupled in the circumferential direction to the predetermined position of the outer peripheral surface of the rope drum or the chain drum and the other side surface spaced apart by a given distance from the outer peripheral surface of the first moving clutch or the second moving clutch; an oil seal coupled to the lower portion of the other side surface of the cover in such a manner as to be contacted with the outer peripheral surface of the first moving clutch or the second moving clutch; and an air vent formed at a given position along the longitudinal direction of the cover to prevent a space portion formed between the first fixing clutch and the first moving clutch or between the second fixing clutch and the second moving clutch from being vacuumed.

According to the present invention, desirably, the oil seal comprises a body portion having an elastic material mounted at the inside thereof and a sealing portion extended outwardly from both end portions of one side surface of the body portion.

According to the present invention, desirably, the first moving clutch and the second moving clutch have linings coupled in a circumferential direction on the outer peripheral surfaces thereof so as to reduce the frictional forces with the oil seals.

According to the present invention, desirably, the first fixing clutch and the second fixing clutch have at least one or more insertion grooves formed in a circumferential direction along the outer peripheral surface thereof, and the first moving clutch and the second moving clutch have at least one or more insertion protrusions formed in a circumferential direction along the outer peripheral surface thereof in such a manner as to be engaged with the insertion grooves.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
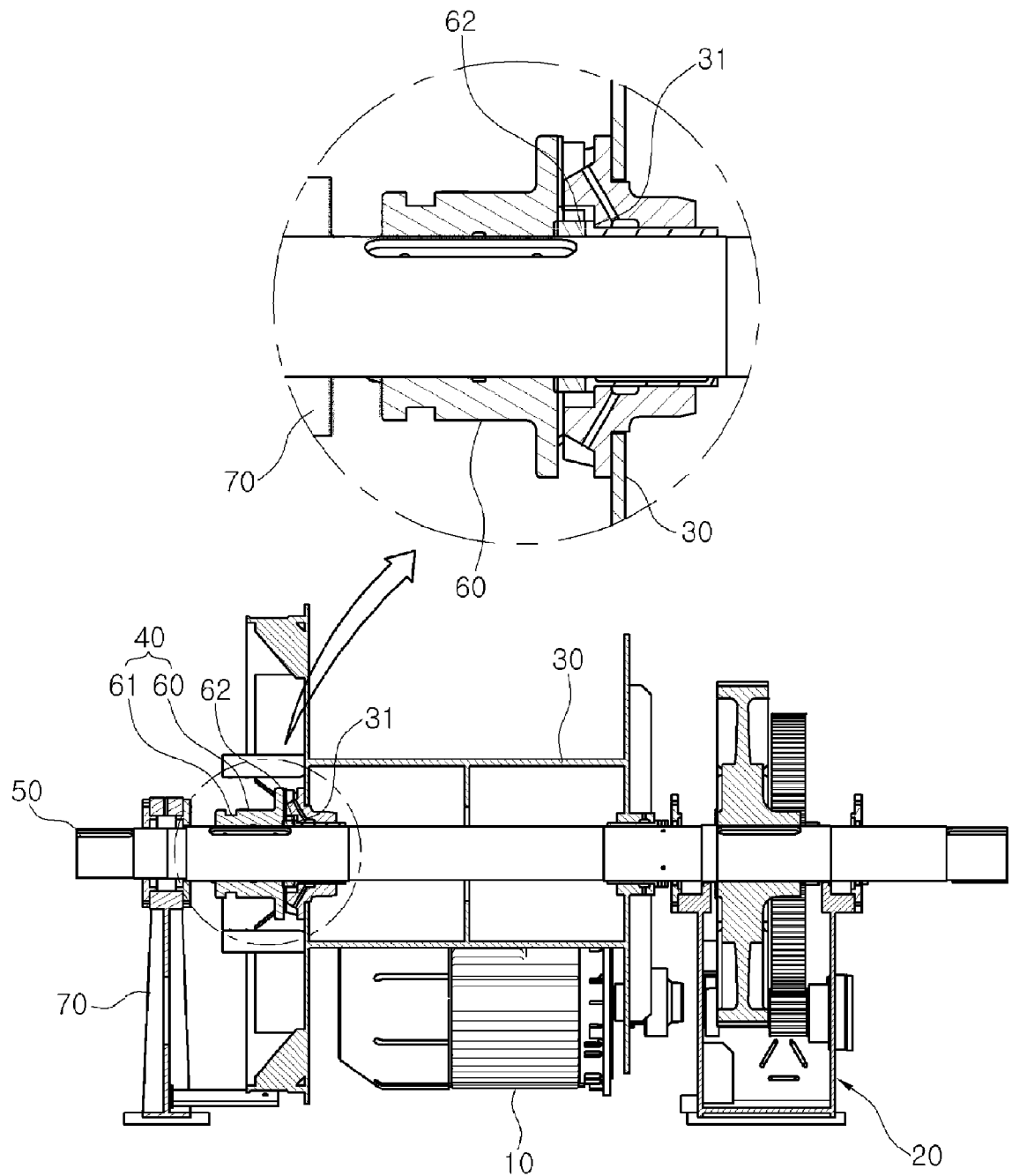
FIG. 1 is a perspective view showing a conventional marine vessel winch.

Hereinafter, an explanation on a marine vessel winch equipped with hermetically sealed clutches according to the present invention will be in detail given with reference to the attached drawing. In the description, the thicknesses of the lines or the sizes of the components shown in the drawing may be magnified for the clarity and convenience of the description.

Further, the terms as will be discussed later are defined in accordance with the functions of the present invention, but may be varied under the intention or regulation of a user or operator. Therefore, they should be defined on the basis of the whole scope of the present invention.

Figure 2:
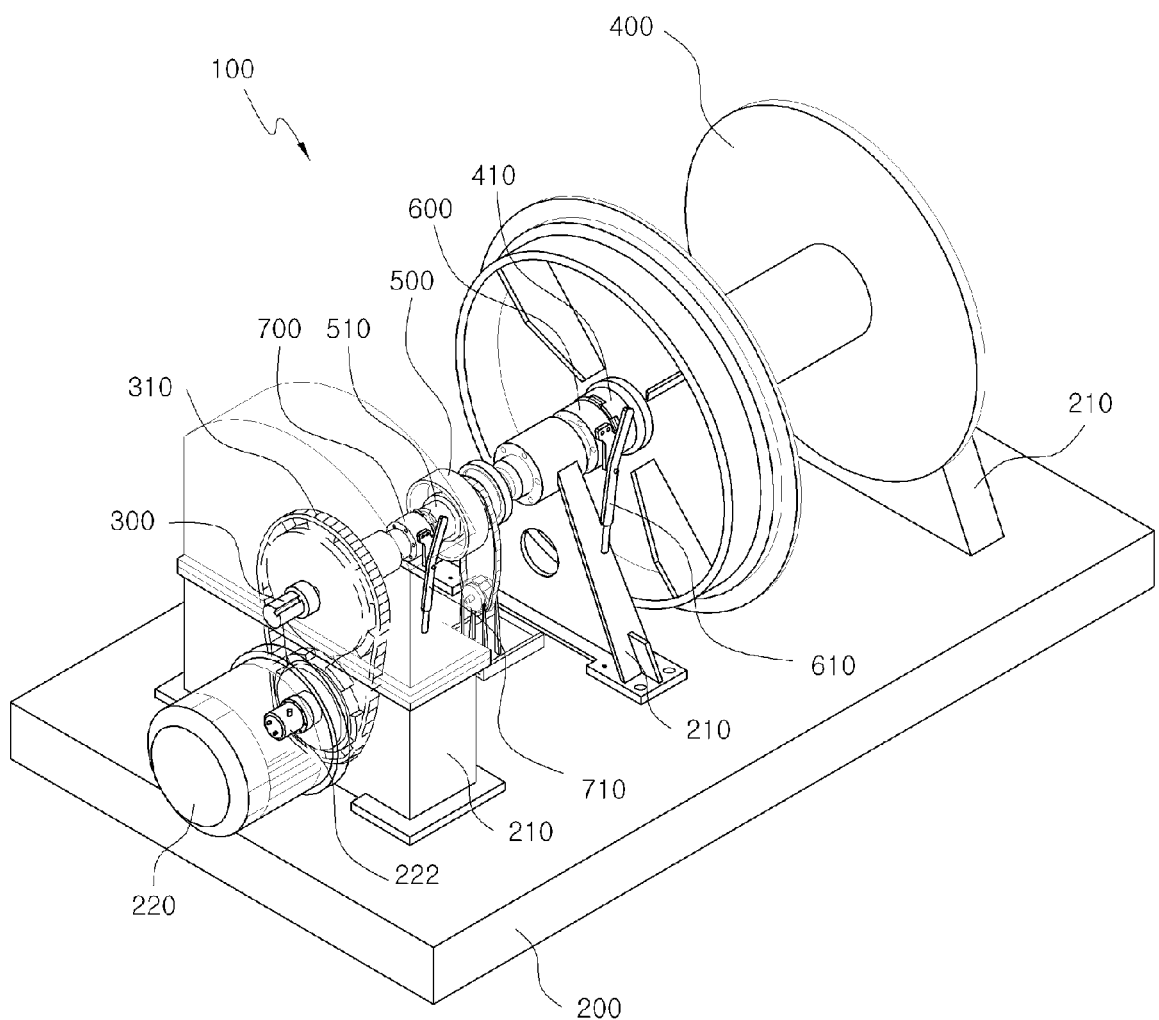
FIG. 2 is a perspective view showing a marine vessel winch equipped with hermetically sealed clutches according to the present invention.
Figure 3:
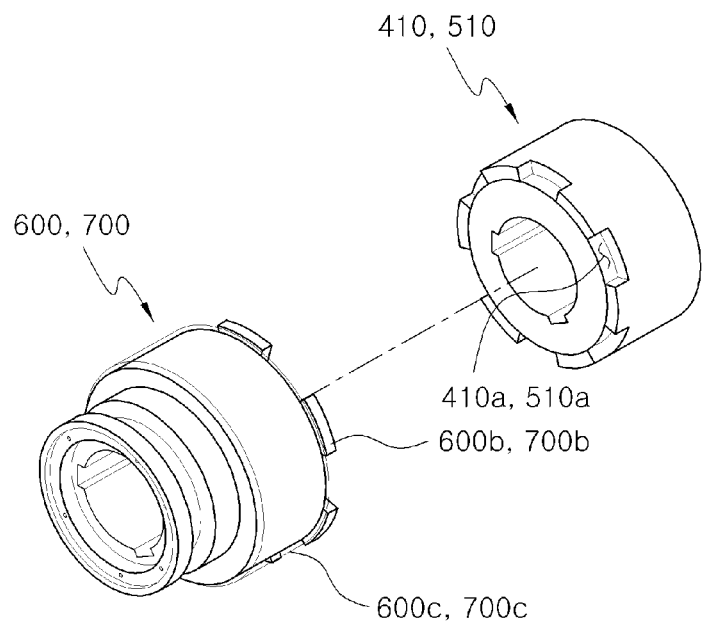
FIG. 3 is a perspective view showing first and second fixing clutches and first and second moving clutches of FIG. 2.
Figure 3:
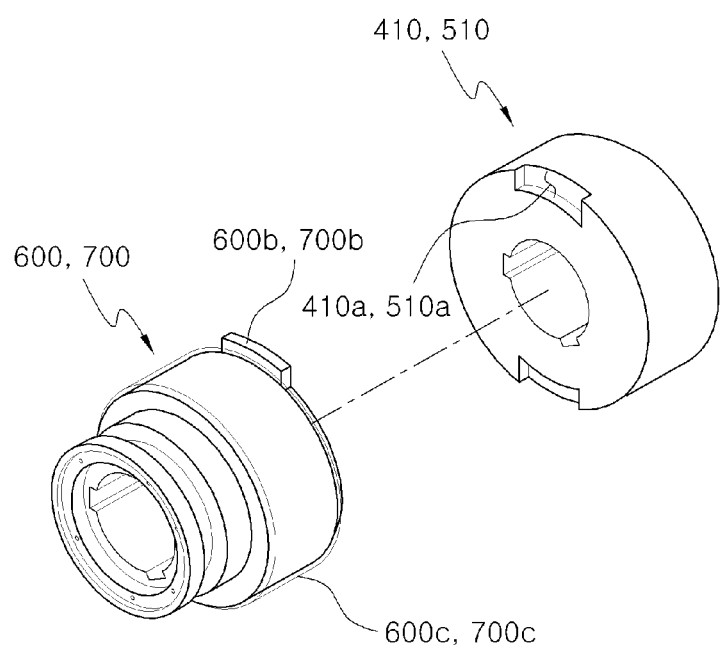
Figure 4:
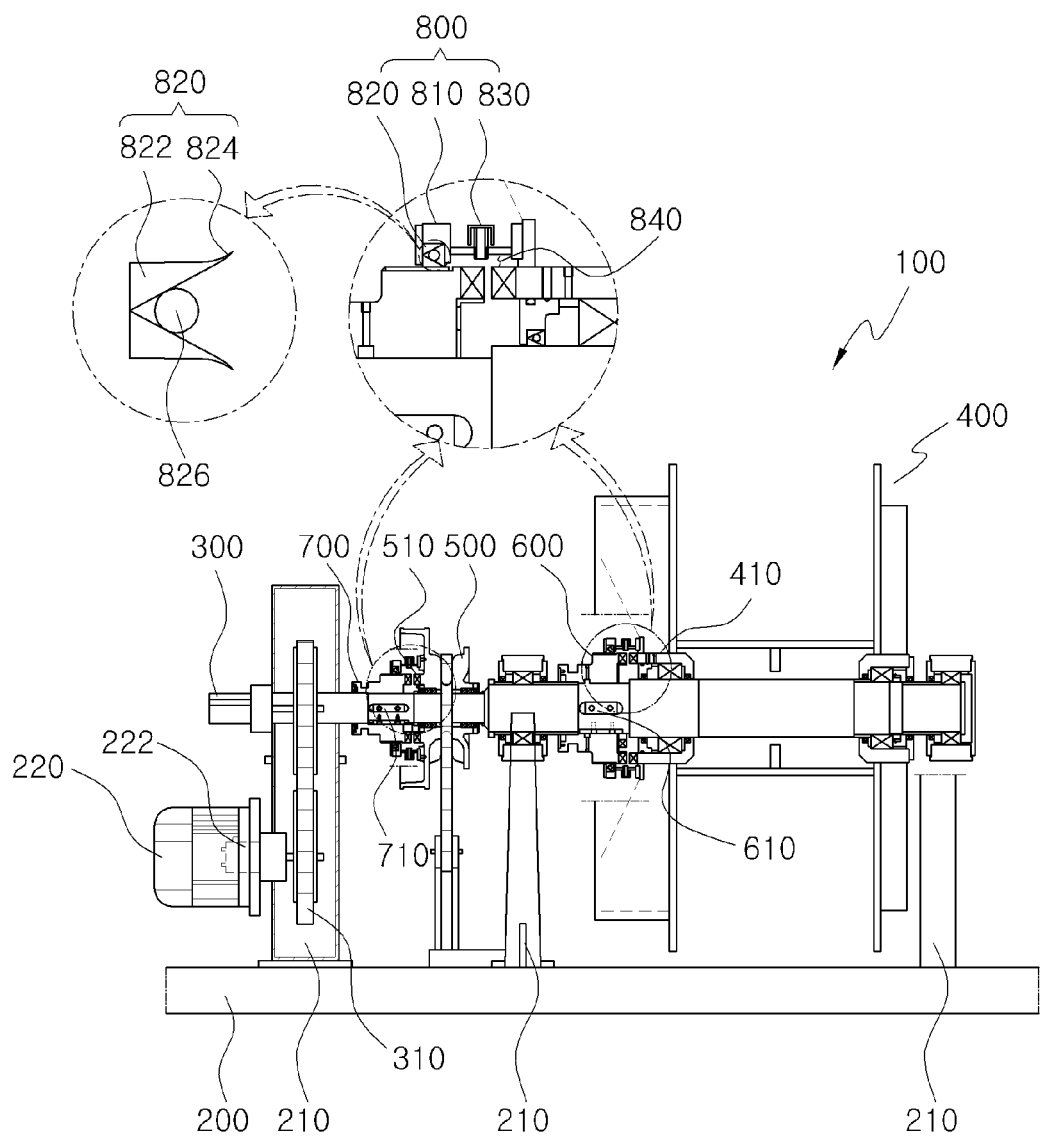
FIG. 4 is a side sectional view showing the marine vessel winch equipped with hermetically sealed clutches according to the present invention.

FIG. 2 is a perspective view showing a marine vessel winch equipped with hermetically sealed clutches according to the present invention, FIG. 3 is a perspective view showing first and second fixing clutches and first and second moving clutches of FIG. 2, and FIG. 4 is a side sectional view showing the marine vessel winch equipped with hermetically sealed clutches according to the present invention.

Referring to FIGS. 2 to 4, a marine vessel winch 100 equipped with hermetically sealed clutches according to the present invention largely includes a support plate 200 on which a plurality of support frames 210 is disposed, a rotary shaft 300, a rope drum 400, a chain drum 500, a first moving clutch 600, a second moving clutch 700, and sealing members 800.

The support frames 210 are spaced apart from each other on the top surface of the support plate 200, and a driving motor 220 is mounted on one side of any one of the support frames 210.

The support frame 210 on which the driving motor 220 is mounted has a decelerator 310 mounted at the inside thereof, and the decelerator 310 is adapted to connect a driving shaft of the driving motor 220 with the end portion of the rotary shaft 300 as will be discussed later and thus to transmit the driving force of the driving motor 220 to the rotary shaft 300.

The rotary shaft 300 is rotatably coupled to the support frames 210 in such a manner as to be coupled at predetermined positions thereof in the longitudinal direction thereof to the rope drum 400 and the chain drum 500.

The rope drum 400 and the chain drum 500 are coupled to the sealing members 800 as will be discussed later in such a manner as to be fitted rotatably to the rotary shaft 300, and they have a first fixing clutch 410 and a second fixing clutch 510 mounted on one sides thereof.

In this case, the first fixing clutch 410 and the second fixing clutch 510 have at least one or more insertion grooves 410*a* and 510*a* formed in a circumferential direction along the outer peripheral surfaces thereof.

The insertion grooves 410*a* and 510*a* are engaged with insertion protrusions 600*b* and 700*b* formed in a circumferential direction along the outer peripheral surfaces of the first moving clutch 600 and the second moving clutch 700 as will be discussed later when the first moving clutch 600 and the second moving clutch 700 are moved toward the first fixing clutch 410 and the second fixing clutch 510.

The first moving clutch 600 and the second moving clutch 700 are coupled slidably movably to the rotary shaft 300 and have linings 600*c* and 700*c* coupled in a circumferential direction on the outer peripheral surfaces thereof so as to reduce the frictional forces with oil seals 820 as will be explained later.

The first moving clutch 600 is spaced apart from the rope drum 400 by a given distance in such a manner as to be coupled slidably movably to the rotary shaft 300 and selectively engaged with the first fixing clutch 410 disposed on the rope drum 400 to transmit the rotary force of the rotary shaft 300 to the rope drum 400.

The second moving clutch 700 is spaced apart from the chain drum 500 by a given distance in such a manner as to be coupled slidably movably to the rotary shaft 300 and selectively engaged with the second fixing clutch 510 disposed on the chain drum 500 to transmit the rotary force of the rotary shaft 300 to the chain drum 500.

The sealing members 800 are coupled on one side surfaces thereof in circumferential directions to predetermined positions of the outer peripheral surfaces of the rope drum 400 and the chain drum 500, and they are contacted on the lower portions of the other side surfaces with the outer peripheral surfaces of the first moving clutch 600 and the second moving clutch 700.

Each sealing member 800 includes: a cover 810 having one side surface coupled in the circumferential direction to the predetermined position of the outer peripheral surface of the rope drum 400 or the chain drum 500 and the other side surface spaced apart by a given distance from the outer peripheral surface of the first moving clutch 600 or the second moving clutch 700; the oil seal 820 coupled to the lower portion of the other side surface of the cover 810 in such a manner as to be contacted with the outer peripheral surface of the first moving clutch 600 or the second moving clutch 700; and an air vent 830 formed at a given position along the longitudinal direction of the cover 810 to prevent a space portion 840 formed between the first fixing clutch 410 and the first moving clutch 600 or between the second fixing clutch 510 and the second moving clutch 700 from being vacuumed, thereby allowing air circulation and pressure discharging to be easily conducted.

In this case, the cover 810 is adapted to prevent seawater or foreign materials from entering the space portion 840 formed between the first fixing clutch 410 and the first moving clutch 600 or between the second fixing clutch 510 and the second moving clutch 700 on one side of the rope drum 400 or the chain drum 500 coupled rotatably to the rotary shaft 300.

The oil seal 820 is coupled to the lower portion of the other side surface of the cover 810 in such a manner as to be brought into contact with the outer peripheral surface of the first moving clutch 600 or the second moving clutch 700.

The oil seal 820 includes a body portion 822 having an elastic material 826 mounted at the inside thereof and a sealing portion 824 extended outwardly from both end portions of one side surface of the body portion 822.

In this case, the elastic material 826 is adapted to apply an elastic force to the body portion 822 so that the body portion 822 can be brought into close contact with the outer peripheral surface of the first moving clutch 600 or the second moving clutch 700.

The sealing portion 824 is adapted to prevent seawater from entering a minute gap formed between the body portion 822 and the first moving clutch 600 or the second moving clutch 700 when the first moving clutch 600 or the second moving clutch 700 is slidably moved and coupled to the first fixing clutch 410 or the second fixing clutch 510.

The air vent 830 is formed at the given position along the longitudinal direction of the cover 810 and adapted to prevent the space portion 840 formed between the first fixing clutch 410 and the first moving clutch 600 or between the second fixing clutch 510 and the second moving clutch 700 from being vacuumed when the first moving clutch 600 or the second moving clutch 700 is engaged with or separated from the first fixing clutch 410 or the second fixing clutch 510.

That is, the air vent 830 is adapted to discharge the internal air of the space portion 840 to the outside when the first moving clutch 600 or the second moving clutch 700 is engaged with the first fixing clutch 410 or the second fixing clutch 510, and contrarily, the air vent 830 is adapted to allow external air from being introduced into the space portion 840 when the first moving clutch 600 or the second moving clutch 700 is separated from with the first fixing clutch 410 or the second fixing clutch 510, so that the formation of the vacuum state in the space portion 840 is prevented to allow the operation of the first moving clutch 600 or the second moving clutch 700 to be gently conducted.

Under the above-mentioned configuration, hereinafter, an explanation on the operating state of the marine vessel winch 100 equipped with the hermetically sealed clutches according to the present invention will be given.

If the driving motor 220 operates, first, the driving force generated from the driving motor 220 is transmitted to the rotary shaft 300 through the decelerator 310 connecting the driving shaft 222 of the driving motor 220 and the end portion of the rotary shaft 300, and thus, the first moving clutch 600 and the second moving clutch 700, which are adapted to be engaged selectively with the first fixing clutch 410 and the second fixing clutch 510 mounted on one sides of the rope drum 400 and the chain drum 500 coupled rotatably to the rotary shaft 300, are operated cooperatively and rotated with the rotary shaft 300.

If it is desired that only the chain drum 500 is operated, a second handle 710 mounted on the second moving clutch 700 is slidingly moved to allow the insertion protrusions 700b formed on the outer peripheral surface of the second moving clutch 700 to be engaged with the insertion grooves 510a formed on the outer peripheral surface of the second fixing clutch 510, thereby making the chain drum 500 rotated.

Contrarily, if it is desired that only the rope drum 400 is operated, the operating process of the rope drum 400 is the same as that of the chain drum 500.

Further, If the rope drum 400 and the chain drum 500 are at the same time operated, the first handle 610 and the second handle 710 mounted on the first moving clutch 600 and the second moving clutch 700 are slidingly moved to allow the first moving clutch 600 and the second moving clutch 700 to be engaged with the first fixing clutch 410 and the second fixing clutch 510.

That is, the insertion protrusions 600b and 700b formed on the outer peripheral surfaces of the first moving clutch 600 and the second moving clutch 700 are engaged with the insertion grooves 410a and 510a formed on the outer peripheral surfaces of the first fixing clutch 410 and the second fixing clutch 510, thereby making the rope drum 400 and the chain drum 500 rotated.

As mentioned above, the marine vessel winch 100 equipped with the hermetically sealed clutches according to the present invention can be provided with the sealed space in which the introduction of seawater or the accumulation of sediments is prevented, thereby allowing the operation thereof to be gently conducted.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A marine vessel winch equipped with hermetically sealed clutches, comprising:
   a support plate on which a plurality of support frames is disposed;
   a rotary shaft rotatably coupled to the support frames;
   a rope drum rotatably coupled to the rotary shaft at a predetermined position in the longitudinal direction of the rotary shaft and having a first fixing clutch mounted on one side thereof;
   a chain drum rotatably coupled to the rotary shaft in such a manner as to be spaced apart from the rope drum by a given distance and having a second fixing clutch mounted on one side thereof;
   a first moving clutch and a second moving clutch coupled slidably movably to the rotary shaft in such a manner as to be spaced apart from one sides of the rope drum and the chain drum and selectively engaged with the first fixing clutch and the second fixing clutch to transmit the rotary force of the rotary shaft to the rope drum and the chain drum; and
   sealing members having one side surface coupled in a circumferential direction to a predetermined position of an outer peripheral surface of the rope drum and the chain drum and having the lower portions of the other side surfaces brought into contact with an outer peripheral surface of the first moving clutch and the second moving clutch,
   wherein each sealing member comprises:
   a cover having one side surface coupled in the circumferential direction to the predetermined position of the outer peripheral surface of the rope drum or the chain drum and the other side surface spaced apart by a given distance from the outer peripheral surface of the first moving clutch or the second moving clutch;
   a seal coupled to the lower portion of the other side surface of the cover in such a manner as to be contacted with the outer peripheral surface of the first moving clutch or the second moving clutch; and
   an air vent formed at a given position along the longitudinal direction of the cover to prevent a space portion formed between the first fixing clutch and the first moving clutch or between the second fixing clutch and the second moving clutch from being vacuumed, and
   wherein the air vent is adapted to discharge internal air of the space portion to an outside area when the first moving clutch or the second moving clutch is engaged respectively with the first fixing clutch or the second fixing clutch, and contrarily, the air vent is adapted to allow external air to be introduced into the space portion when the first moving clutch or the second moving clutch is separated respectively from the first fixing clutch or the second fixing clutch.

2. The marine vessel winch equipped with hermetically sealed clutches according to claim 1, wherein the first moving clutch and the second moving clutch have linings coupled in a circumferential direction on the outer peripheral surfaces thereof so as to reduce the frictional forces with the seals.

3. The marine vessel winch equipped with hermetically sealed clutches according to claim 1, wherein the seal comprises a body portion having an elastic material mounted at the inside thereof and a sealing portion extended outwardly from both end portions of one side surface of the body portion.

4. The marine vessel winch equipped with hermetically sealed clutches according to claim 1, wherein the first fixing clutch and the second fixing clutch have at least one or more insertion grooves formed in a circumferential direction along the outer peripheral surface thereof, and the first moving clutch and the second moving clutch have at least one or more insertion protrusions formed in a circumferential direction along the outer peripheral surface thereof in such a manner as to be engaged with the insertion grooves.

* * * * *